(12) United States Patent
Rastegar

(10) Patent No.: US 10,775,403 B2
(45) Date of Patent: Sep. 15, 2020

(54) ACCELERATION EVENT DETECTION AND DIFFERENTIAL SENSORY DEVICES AND METHODS

(71) Applicant: Jahangir S Rastegar, Stony Brook, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 81 days.

(21) Appl. No.: 15/912,532

(22) Filed: Mar. 5, 2018

(65) Prior Publication Data
US 2018/0252743 A1    Sep. 6, 2018

Related U.S. Application Data

(60) Provisional application No. 62/467,800, filed on Mar. 6, 2017.

(51) Int. Cl.
| | |
|---|---|
| *G01P 1/00* | (2006.01) |
| *F42C 1/00* | (2006.01) |
| *G01P 15/08* | (2006.01) |
| *G01B 5/06* | (2006.01) |
| *G01B 7/06* | (2006.01) |
| *H02N 2/18* | (2006.01) |
| *G01B 21/08* | (2006.01) |
| *F42C 11/02* | (2006.01) |
| *F42C 1/10* | (2006.01) |
| *F42C 15/24* | (2006.01) |

(52) U.S. Cl.
CPC ............... *G01P 15/08* (2013.01); *F42C 1/10* (2013.01); *F42C 11/02* (2013.01); *F42C 15/24* (2013.01); *G01B 5/06* (2013.01); *G01B 7/06* (2013.01); *G01B 21/08* (2013.01); *G01P 15/0802* (2013.01); *G01P 15/0891* (2013.01); *H02N 2/183* (2013.01); *G01P 2015/0828* (2013.01); *G01P 2015/0862* (2013.01); *G01P 2015/0871* (2013.01); *H02N 2/181* (2013.01)

(58) Field of Classification Search
CPC ............. G01P 15/08; F42C 1/10; F42C 11/02
See application file for complete search history.

(56) References Cited

U.S. PATENT DOCUMENTS

| | | | |
|---|---|---|---|
| 9,587,924 B2* | 3/2017 | Rastegar | F42C 11/02 |
| 2017/0133954 A1* | 5/2017 | Rastegar | H02N 2/181 |
| 2018/0123485 A1* | 5/2018 | Rastegar | H02N 2/181 |
| 2019/0003810 A1* | 1/2019 | Rastegar | F41B 9/0021 |
| 2019/0063891 A1* | 2/2019 | Rastegar | H02N 2/181 |

* cited by examiner

Primary Examiner — Jamel E Williams

(57) ABSTRACT

A method for detecting hardened bunkers within a target, the method including: producing a first output from a sensor fired to travel through the hardened bunkers, the first output being different from a second output when the sensor travels in a void between the hardened bunkers or encounters other objects outside of the hardened bunkers; and determining one or more of the number of hardened bunkers, a thickness of the hardened bunkers and a strength of the hardened bunkers based on the first and second outputs of the sensor over time. The sensor can include one of a piezoelectric generator for producing a voltage output and a circuit input by the voltage output or an accelerometer having a locking member for locking a proof mass during periods of impact with the one or more hardened bunkers.

6 Claims, 4 Drawing Sheets

ACCELERATION EVENT DETECTION AND DIFFERENTIAL SENSORY DEVICES AND METHODS

CROSS-REFERENCE TO RELATED APPLICATION

This application claims the benefit of U.S. Provisional Application No. 62/467,800 filed on Mar. 6, 2017, the entire contents of which is incorporated herein by reference.

This application is related to U.S. Pat. No. 8,646,334, issued Feb. 11, 2014, and U.S. Pat. No. 6,626,040, issued Sep. 30, 2003, the entire contents of which are incorporated herein by their reference.

BACKGROUND OF THE INVENTION

1. Field of the Invention

The present invention relates generally to acceleration sensors, and more particularly to microelectromechanical system (MEMS) based acceleration and event detection and differential sensory devices and methods.

2. Prior Art

There is a need in the military to defeat precisely located targets within bunkers with several hardened barriers of targets located inside building structures beyond multiple dense structural layers. Such void sensing survivable fuzing capability is also required to engage enemy forces within multi-story urban structures using cannon-based precision munitions. Such void sensing sensors must be capable of detecting voids following impact with dense structural layers. In gun-fired munitions, the technology must also be capable of differentiating setback and set-forward shock loading from shock loading due to impact with dense structural layers. The technology should be capable of media discrimination so that encounters with relatively rigid objects within the void is differentiated from hardened barriers. The technology must also be capable of measuring the distance between hardened barriers to ensure that the spaces between multiple close barriers of a bunker are not counted as bunker spaces.

The current technologies developed for void sensing are generally based on using accelerometers to detect acceleration as the projectile encounters multiple dense structural layers and employ signal processing techniques to extract information related to the number of encountered voids and their thickness and strengths. The current approaches have several basic hurdles to overcome, particularly as a highly reliable, relatively small, low power and low-cost component for most military applications. The main hurdle is related to the fact that since the dense structural layers, such as hardened bunker layers and thick concrete floors, are relatively close to each other, the time that it takes for the projectile to pass through the intermediate void is only a few milliseconds. Thus, currently available accelerometers with their relatively long settling time produce very noisy signals, which makes it difficult to extract the impact duration and the distance travelled between two such "dense structural layer" encounters without the use of highly sophisticated and complex—thereby large, high power and expensive—computational hardware and software. In many more complex encounters, such as where dense and heavy office furniture and equipment or intermediate columns or beams are encountered, it becomes almost impossible to extract void counts and hardened bunker wall and the like information from such noisy signals.

The state of art in shock resistant MEMS accelerometer design is to reduce the size of the moving proof-mass, thereby reducing the related forces, moments, and torques that are generated in the presence of high acceleration levels, i.e., when the accelerometer experiences shock or impact loading with levels significantly higher than the operational levels of the device. In general, stops are also provided in the path of the moving components of the accelerometer to limit deformation to protect the components from failure.

The introduction of MEMS technology has made it possible to significantly reduce the size of the device, including its proof-mass, independent of the accelerometer type and its mechanism of operation. All existing accelerometer designs, however, generally suffer from the following operational and/or performance shortcomings if the sensor is expected to be subjected to high levels of shock loadings, such as those to be experienced during a projectile's encounter with hardened bunker barriers. Even when not in operation, accidental shock loading, such as during accidental drops over hard surfaces can damage highly sensitive MEMS type accelerometers.

To minimize damage to the moving parts of the sensor, designers reduce the size of the proof-mass and its other moving parts. The reduction of the size of the proof-mass, however, results in the reduction of its sensitivity since it is directly related to the relative size of its proof-mass. This is the case even if the shape and design of the accelerometer structure is optimally selected. Thus, since highly accurate accelerometers are required for the present hardened bunker layer thickness estimation, void detection and length measurement and counting, an accelerometer that can withstand tens of thousands of Gs during the hardened barrier encounter with a floating proof-mass cannot be designed to provide high levels of precision for void length measurement. This is also the case for accelerometers for smart munitions guidance and control during their flight and other similar applications in which resolutions in $\frac{1}{100}$ of one G or even significantly better may be required.

Another major shortcoming is related to the significant amount of time required for the accelerometer to settle within an acceptable level following shock loading. All inertial sensors, particularly accelerometers, rely upon the deflection of one or more elastic structural elements of the sensor to make their sensory measurements. When subjected to shock loading, an accelerometer that is sensitive enough for accurate distance measurement would saturate, i.e., the proof-mass reaches and impacts its hard travel stops. The mechanical energy stored in the sensor moving and elastic components will cause the sensor structure to vibrate following such events, requiring time (settling time) for the vibration amplitude to reduce to an acceptable level. In the present application, such settling times makes it difficult for the sensor to measure travelled distances between multiple shock loadings.

SUMMARY OF THE INVENTION

A novel MEMS accelerometer technology for the design and fabrication of inertia devices, such as accelerometers for gun-fired munitions is applied herein for void sensing and counting sensors, such as for use in projectiles designed to defeat precisely located targets within hardened bunkers with multiple hardened layers or internal building structures with hardened walls and/or floors, after encountering several such dense structural layers. The developed MEMS accelerometer technology allows the use of a relatively large proof mass, thereby making the sensor highly sensitive, by providing means of locking the proof-mass to the sensor base structure when the acceleration level reaches a prescribed threshold. In addition, since the proof-mass is locked at its null position, once the high-G shock loading is ceased, the proof-mass is close to its null position and therefore requires a negligible amount of time to settle.

In addition to the high sensitivity and high-G MEMS accelerometer, a piezoelectric based sensor, which is very simple, very small, very low-cost, and highly reliable for multiple-impact event and magnitude detection is used for hardened bunker impact and strength as well as void detection and counting as a function of time. Devices based on the design of such a sensor have been shown to be capable of withstanding high-G shock loading of well over 100,000 G in gun-fired munitions and successfully detect all-fire event and differentiate it from all no-fire events.

The piezoelectric based sensor with its simple and passive electronic circuit and logic can be used with the proposed MEMS accelerometer or any other low-cost accelerometer that can withstand the shock loading with minimal settling time to provide the desired sensory system with significantly improved performance. In many military applications, however, the proposed piezoelectric based sensor concept may be enough to provide the desired void sensing and counting as well as thickness and strength measurement capabilities.

Two acceleration and event detection and differentiation sensory device embodiments are disclosed. The first is a highly sensitive MEMS accelerometer that can withstand shock loadings of up to 100,000 Gs while capable of measuring accelerations of a small fraction of one G, almost instantly after such shock loadings, i.e., with negligible settling time. These MEMS accelerometers can detect hardened bunker layer impact, while they also very accurately detect and count voids and determine their length in the direction of the travel. The second is piezoelectric based, very simple, very small, very low-cost, and highly reliable multiple-impact event and magnitude detection sensor that can be used for hardened bunker layer encounter detection, measurement of its strength and thickness, and detection of voids and their numbers.

In different military applications, the sensor embodiments can be used separately or together to provide the capability for sensing a hardened bunker impact event, measure its thickness and strength, detect voids between bunker layers and their lengths, and count the number of voids with a certain level of sensory redundancy to achieve high reliability and precision with increased robustness.

Performance characteristics of the embodiments include:

1. The MEMS accelerometer is provided with a mechanism to lock the proof-mass to its base structure during high impact loadings, thereby allowing the use of a larger proof-mass and very accurate acceleration measurements during the flight (to measure distance between the hardened bunker barriers);

2. Since the MEMS accelerometer proof-mass is locked during impact loadings, the duration of each impact loading and void travel can be measured without the use of sophisticated computational hardware and software, making the resulting sensory system small and low-cost;

3. The MEMS accelerometer can readily measure the strength of the impacted hardened bunker layers from the impact time duration and average loss of projectile speed;

4. The MEMS accelerometers require minimal time to settle between shock loadings as a result of encounters with hardened bunker layers since their proof-mass is locked to the sensor base structure at its null position, thereby providing the means to make an accurate measurement of the length of void travel;

5. The piezoelectric based sensor with its very simple and passive electronic circuit and logic can detect interaction with hardened bunker layers generating decelerations of over 100,000 Gs with piezoelectric protection packaging and provide a very sharp output signal that is proportional to the projectile deceleration, and thereby to the strength of the bunker layer. The layer thickness can then be calculated by integration of the measured deceleration over time;

6. The piezoelectric based sensor is very simple in design and electronic circuit and logic and very small and low-cost, but highly reliable for detecting hardened bunker impact events and their magnitudes and thickness, and count their numbers as a function of time;

7. The novel design of the piezoelectric based sensor electronic circuit and logic discards impacts with less than a prescribed level of strength as well as duration, even impacts with very high shock loading levels that are very short duration, such as those that are due to encounters with relatively rigid office furniture or equipment, or inner columns, etc., provided to mislead proper fuzing action;

8. The piezoelectric based sensor with its simple and passive electronic circuit and logic can be used with the proposed MEMS accelerometer or any other low-cost accelerometer that can withstand the shock loading with minimal settling time—or other onboard sensors—to provide redundancy and improved performance and to measure void lengths;

9. In many military applications, the piezoelectric based sensor concept may be enough to provide the capability to detect hardened bunkers, measure their strength and thickness, and count their numbers as a function of time.

Accordingly, a device for detecting one or more hardened bunkers within a target is provided, the device comprising: a sensor, which when fired to travel through the one or more hardened bunkers, produces a first output, the first output being different from a second output when the sensor travels in a void between the one or more hardened bunkers or encounters other objects outside of the one or more hardened bunkers; and a controller for determining one or more of the number of hardened bunkers, a thickness of the one or more hardened bunkers and a strength of the one or more hardened bunkers based on the first and second outputs of the sensor over time. The sensor can comprise a piezoelectric generator for producing a voltage output and a circuit input by the voltage output. The sensor can comprise an accelerometer having a locking member for locking a proof mass during periods of impact with the one or more hardened bunkers.

Also provided is a method for detecting one or more hardened bunkers within a target, the method comprising: producing a first output from a sensor fired to travel through the one or more hardened bunkers, the first output being different from a second output when the sensor travels in a void between the one or more hardened bunkers or encounters other objects outside of the one or more hardened bunkers; and determining one or more of the number of hardened bunkers, a thickness of the one or more hardened bunkers and a strength of the one or more hardened bunkers based on the first and second outputs of the sensor over time. The sensor can comprises a piezoelectric generator for producing a voltage output and a circuit input by the voltage output. The sensor can comprise an accelerometer having a locking member for locking a proof mass during periods of impact with the one or more hardened bunkers.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

An embodiment of MEMS accelerometers are provided with a means for locking the sensor proof-mass in its "null" position when the sensor is subjected to acceleration levels above a prescribed threshold, thereby protecting the moving parts of the accelerometer. In addition, by locking the proof-mass in its null position, the settling time after a shock loading event is minimized.

In such MEMS type accelerometers, to alleviate the aforementioned shortcomings of proof-mass based accelerometers and other similar inertia based sensors, appropriately designed mechanisms are provided to lock the proof-mass and potentially other moving components of the sensor to the base structure of the sensor. The locking mechanism can be passive, but active locking mechanisms may also be used. The locking mechanisms are designed to lock the proof-mass in its null position when the accelerometer is subjected to a shock with acceleration levels above a certain predetermined threshold. Thus, the proof-mass and other moving components of the sensor are protected from damage.

The active type of locking mechanisms has several advantages. Firstly, the proof-mass locking can be initiated at any programmed acceleration threshold level, and even before certain prescribed events occur or be timed to occur. As a result, such locking mechanisms provide a high level of flexibility to the user. Secondly, they provide the means to lock the proof-mass and other moving elements of the sensor irrespective of the direction of the shock loading.

However, the active type of locking mechanisms suffer from certain shortcomings that appear to make it unsuitable for the present application. The shortcomings include, firstly, that they require event detection sensors to trigger the actuation of the locking mechanism. They would also require additional electronics and/or logics circuitry and/or processing units for event detection to initiate the locking action and to perform other related decision making activities. Secondly, they require actuation devices and electrical power for their operation. For the present application, this requirement translates to a larger, more complex and higher cost sensory system that needs to be powered before deployment.

The passive type of locking mechanisms, however, do not suffer from any of the above shortcomings of the active type of locking mechanisms. The only disadvantage of sensors with passive locking mechanisms as compared to those with active locking mechanisms is that their locking acceleration threshold cannot be varied after fabrication.

Figure 1:
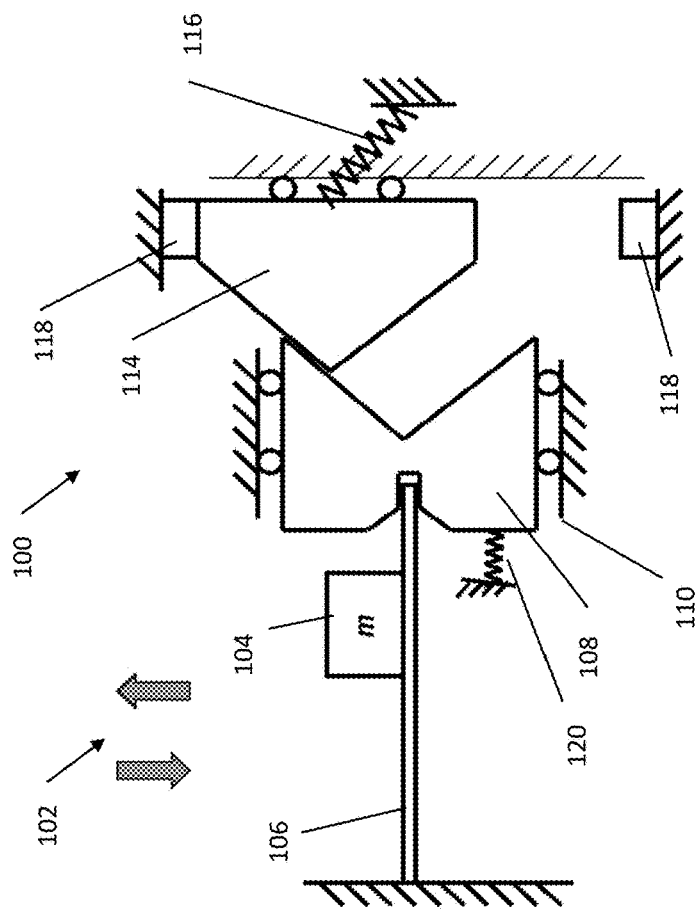
FIG. 1 illustrates a schematic of a MEMS type accelerometer with a proof-mass locking mechanism.

The basic design and operation of the present MEMS accelerometers are described using the schematic of FIG. 1, noting that the objective of providing a proof-mass locking mechanism is the protection of the device's moving parts and to minimize the settling time following a shock loading with peak acceleration levels above a predetermined threshold. The MEMS accelerometer schematic of FIG. 1 is provided for illustrating the basic operation of such locking mechanisms only. This basic mechanism is readily applied to all accelerometer and gyro designs that include elastic and/or moving elements.

The accelerometer sensor of FIG. 1, generally referred to by reference numeral 100, is intended to measure acceleration in the direction of the indicated arrows 102. It consists of a proof mass m 104, which is attached to a relatively flexible cantilever beam (bending) type of elastic element (sensor elastic member) 106 with an equivalent spring rate k at the location of the proof mass 104. The mass m of the proof mass 104 and the equivalent spring rate k are selected to provide the accelerometer sensor 100 with the desired sensitivity. In most MEMS types of accelerometers, the displacing elastic member (beam element in this case) 106 forms one side of a capacitor while the other capacitor plate (not shown) is rigidly attached to the sensor base structure. This capacitor will then form the means for the sensor to measures the elastic displacement of the proof-mass due to the acceleration in the directions shown by the indicated arrows 102.

In the schematic of the MEMS accelerometer shown in FIG. 1, the locking mechanism consists of a locking member 108, which is positioned in a guide 110 in which it can slide laterally towards and away from the sensor elastic member (beam) 106. The locking member 108 is provided with a u-shaped mouth 108a with a tapered leading edges 108b to capture a tip 106a of the sensor elastic member 106 when it is to be locked to the base structure of the sensor 100, shown as the ground in FIG. 1. The locking member 108 is provided with a v-shaped portion 112, forming inclined surfaces opposite to the u-shaped mouth 108a of the locking member 108. The locking mechanism is also provided with a relatively rigid locking mass M 114, which is free to slide up and down as shown in FIG. 1 over the surface of the base structure of the sensor 100. The locking mass 114 is held in place by a spring element 116, which is attached to the locking mass 114 on one side and to the base structure of the sensor 100 on the other side. The locking mass 114 is provided with inclined surfaces 114a, as shown in FIG. 1 that matches the sides of the v-shaped surfaces 112 of the locking member 108. In addition, stops 118 can be provided to limit up and down translation of the locking mass 114 to prevent it from being disengaged from the locking member 108.

Figure 2:
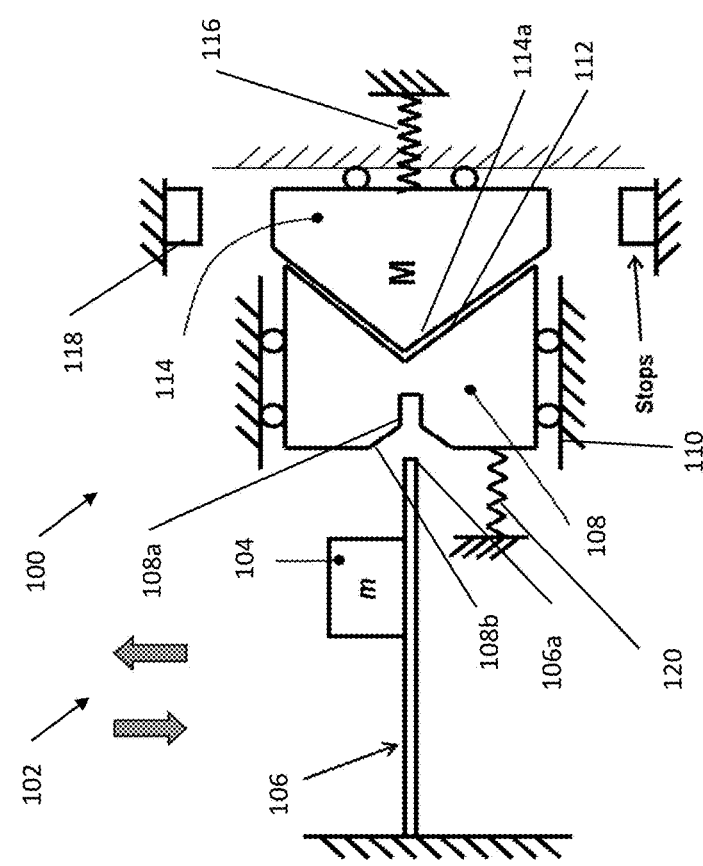
FIG. 2 illustrates the MEMS type accelerometer of FIG. 1 with the proof-mass locked by the locking mechanism.

In the normal condition shown in FIG. 1, the locking member 108 is pushed back against the locking mass 114 by the provided spring element 120, bringing their v-shaped surfaces 112, 114a in full contact. If the sensor 100 is subjected to a high downward acceleration in the direction of the indicated left arrow 102, the dynamic force resulting from the action of the acceleration on the inertia of the locking mass (M) 114 will generate a force that if it is large enough to overcome the forces exerted by the locking mass spring 120 and contact forces between the v-shaped contacting surfaces 112, 114*a*, then it would begin to translate the locking mass 114 upward relative to the locking member 108. As the applied acceleration reaches the prescribed level, the locking mass 114 translates up towards its uppermost stop 118 as shown in FIG. 2, thereby pushing the locking member 108 into position to engage the tip 106*a* of the sensor elastic element 106 and essentially locking the sensor elastic element 106 to the base structure of the sensor 100, as shown in FIG. 2. If the sensor 100 is subjected to a high acceleration level in the opposite direction shown by the right arrow 102, the dynamic force resulting from the action of the acceleration on the locking mass M 114 will generate a force that if it is large enough to overcome the aforementioned spring and surface contact forces, it would begin to translate the locking mass 114 downward relative to the locking member 108 towards its lowermost position stop 118, thereby similarly causing the locking member 108 to be pushed into position to engage the tip 106*a* of the sensor elastic element 106 and essentially locking the sensor elastic element 106 to the base structure of the sensor 100, as shown in FIG. 2.

Figure 4:
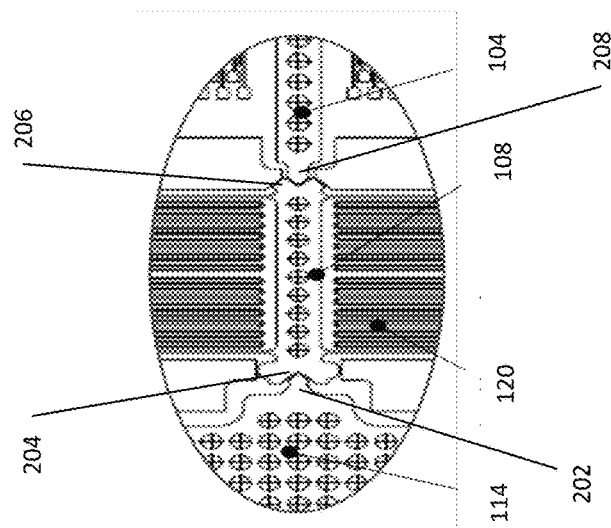
FIG. 4 illustrates a blown-up view of portion A of the MEMS accelerometer of FIG. 3.
Figure 3:
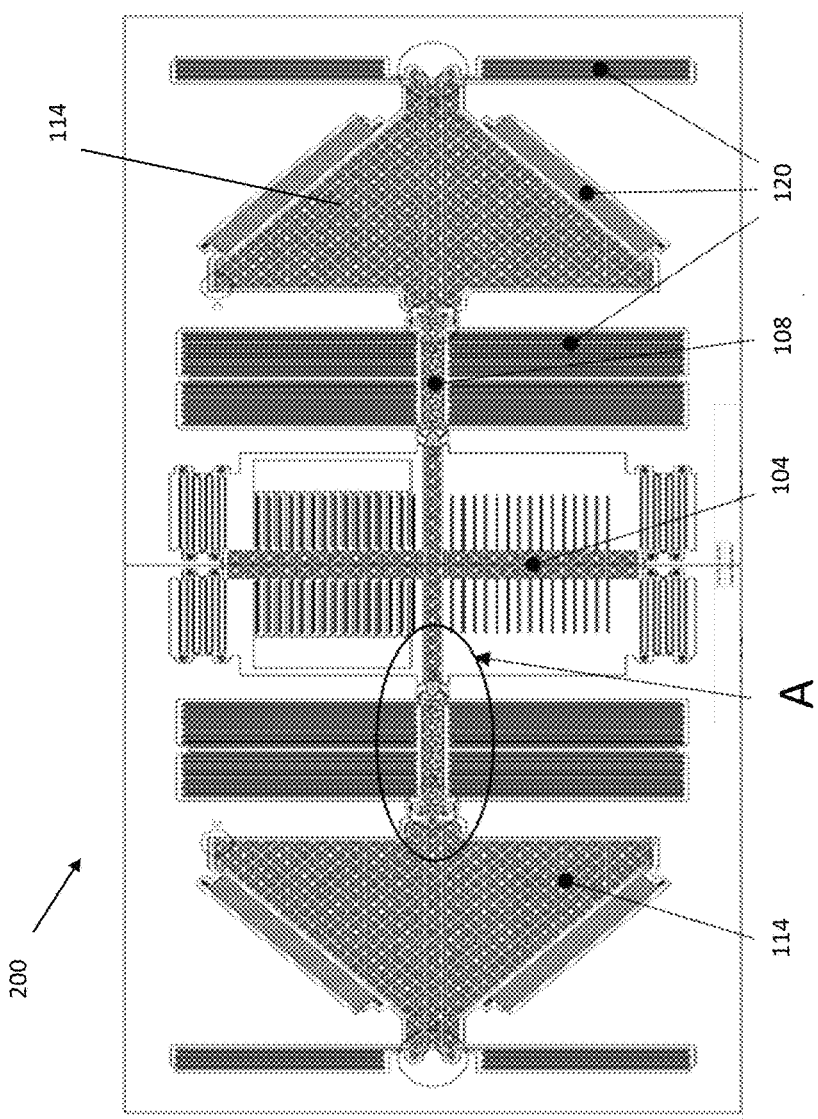
FIG. 3 illustrates a MEMS accelerometer with proof-mass locking mechanism.

The design of the proof-mass locking accelerometer sensor 100 of FIG. 1 was designed and fabricated using a SOI wafer with a thickness of 40 microns. Based on results of tests on the operation and performance of the proof-mass locking mechanism of the fabricated accelerometers, an embodiment of a MEMS accelerometer 200, shown in FIG. 3, was fabricated. Note that the locking mechanism is provided on both sides of a proof-mass 104 to lock it to the sensor structure when the prescribed locking acceleration level is reached. The acceleration is considered in the up and down direction. The blown-up view A of the left locking mechanism is shown in FIG. 4. Here, as the locking acceleration threshold is reached, the locking masses 114 rotate, thereby pushing the locking members 108 towards the proof-mass 104. The V-shaped geometries on the locking member 108 are provided for this purpose and engage the mating members on both the locking mass 114 and the proof-mass 104. There is a gap of about 4 microns that is provided between the locking surfaces at zero acceleration levels (difficult to see in FIGS. 3 and 4 due to the scaling) to provide for free proof-mass motion below the locking acceleration threshold levels.

The device is symmetric since the proof-mass 104 is locked from both sides to the base structure. In this design, a triangular shaped locking mass 114 is shown to be used to reduce its total surface area and make its required locking motion essentially a rotational one. Its mechanical advantage in generating the locking force is also increased. The accelerometer 200 is designed with appropriately sized locking mass 114 and spring rates so that as the design acceleration threshold level is reached, the engaging tip 202 of the locking mass 114 engages the v-shaped groove 204 of the locking member 108 and begins to displace it towards the proof-mass 104. Then by the time that the design acceleration threshold level is reached, the v-shaped groove 206 on the proof-mass side of the locking member 108 would engage the facing matching protrusion 208 on the proof-mass side, thereby forcing it to its center (null) position and together with the locking member 108 positioned on the opposite side of the proof-mass 104 lock the proof-mass 104 to the base structure of the sensor 200. This accelerometer 200 is configured to lock the proof-mass 104 at around 20 Gs and withstand accelerations of up to 100,000 Gs. It is noted that in this configuration, as the acceleration level increases beyond the selected threshold level of 20 Gs, the locking force acting on the proof mass 104 is also increased, thereby ensuring that it is not released at higher G levels.

The pattern of openings in the moving parts of the accelerometer 200 are configured to facilitate its fabrication and minimize stiction. The accelerometer 200 is configured to measure acceleration in the up and down direction of FIG. 3. The acceleration level is measured by the provided comb-shaped capacitors.

The MEMS accelerometer proof-mass 104 is locked during impact loadings, the duration of each impact loading and void travel can be measured without the use of sophisticated computational hardware and software, making the resulting sensory system small and low-cost. The MEMS accelerometer 200 can therefore readily measure the strength of the impacted hardened bunker layers from the impact time duration and average loss of projectile speed. The MEMS accelerometers 200 require minimal time to settle between shock loadings as a result of encounters with hardened bunker layers since their proof-mass 104 is locked to the sensor base structure at its null position, thereby providing the means to make an accurate measurement of the length of void travel. The MEMS accelerometer 200 outputs are input to a controller for determining one or more of the number of hardened bunkers, a thickness of the one or more hardened bunkers and a strength of the one or more hardened bunkers based on the output of the MEMS accelerometer 200 over time.

An embodiment of the piezoelectric based sensor 300 with its impact event detection electronic circuit and logic will now be described, starting with its exemplary circuit of FIG. 5. The circuit is passive since it does not require any external source of power and is configured to differentiate high acceleration shock loading events, such as the present impact and travel through hardened bunker layers, that are relatively long in duration, from all other high-G but short duration events, such as impact with bunker equipment and heavy furnishing, as well as relatively low peak G but long term vibration loading, such as those experienced during transportation and the like. The latter two events are hereinafter referred to as "non-event" encounters.

Figure 5:
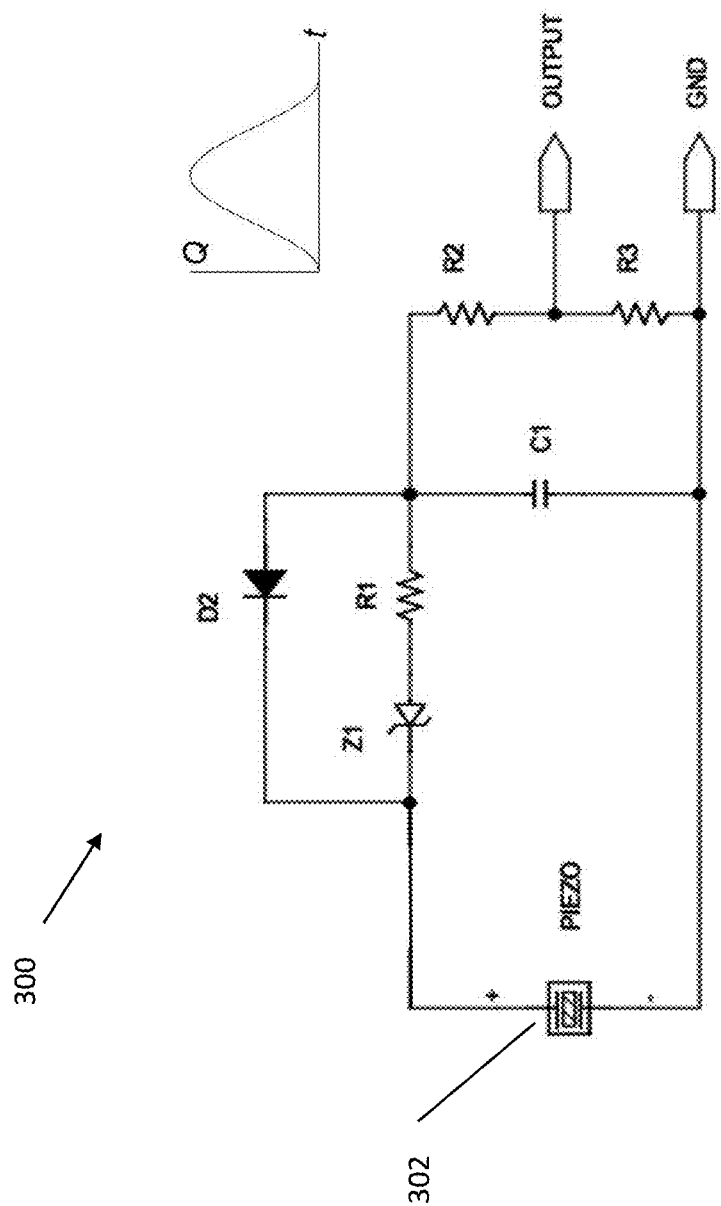
FIG. 5 illustrates a safety and all-fire detection circuit of a self-powered initiation device.

In the circuit of FIG. 5, electrical energy (charge) is provided by a piezoelectric element 302 that is subjected to compressive loading due to the experienced acceleration event. In general, the piezoelectric element 302 can be small (4-5 mm in diameter and 2-3 mm in height) and can be protected from overloading, mainly in tension, using any one of the methods known in the art. Piezoelectric energy harvesters are known in the art for munitions applications that can withstand shock loading of well over 100 KGs. In FIG. 5, a typical charge voltage as a function of time during a shock loading of such a piezoelectric is also shown. In general, a relatively small mass (1-2 grams for the above sized piezoelectric elements) can be attached to the piezoelectric element 302 to provide high enough compressive loading to generate charges with high enough voltages (50-60 Volts).

In the circuit of FIG. 5, the resistance of the resistor R1 is high to minimize current passing through and the capacitance of the capacitor C1 is very low so that the piezoelectric element 302 driving the circuit could be very small. The resistances of the resistors R2 and R3 can also be high with the primary function of being a voltage divider.

Now consider the situation in which the projectile that is provided with the piezoelectric based sensor 300 encounters a hardened bunker barrier. As a result of the shock loading of the piezoelectric element 302 due to the hardened bunker barrier, the piezoelectric element 302 of the sensor 300 will generate a charge proportional to its shock induced deceleration, such as the one shown on the top of FIG. 5. A current due to the charges generated by the piezoelectric element 302 will then pass through diode Z1 (such as a Zener or a similar diode) and resistor R1 to charge the capacitor C1 and also pass through resistors R2 and R3 to the ground. During this time, the diode D2 is under reverse bias, thereby passing a very small amount of current. The voltage on the capacitor C1 indicates the amount of energy generated by the piezoelectric element 302 due to its (shock or vibration) loading, less the amount of energy drainage through the resistors R2 and R3 and the losses in the diode Z1 and smaller amounts in the remaining circuit elements. The resistors R2 and R3 also act as a programmable divider that can be used to adjust the output voltage level, which corresponds to the shock loading level (rate of deceleration of the projectile). The output and ground can also be used as a differential output.

However, if the projectile is subjected to a relatively short duration shock loading, such as due to impact with a hard and heavy object in the bunker, the piezoelectric element 302 would generate relatively high voltage pulses with a very short duration, unlike the high voltage and relatively long duration shock loadings for encounters with hardened bunker barriers. The generated voltages may even be higher than the voltage levels that are generated as the projectile encounters hardened bunker barriers, but the duration of such pulses is significantly shorter. In the present circuit of FIG. 5, the capacitor C1 and the resistor R1 are sized such that the resulting charging time constant (R1C1) for the capacitor C1 is significantly longer than such "high voltage and short duration" pulses, thereby ensuring that the capacitor C1 is not charged to a voltage level that corresponds to the hardened bunker barrier resistance to the projectile travel. In addition, to ensure that the charges due to several such "high voltage and short duration" pulses do not accumulate in the capacitor C1 and provide a false hardened bunker barrier encounter indication, the diode D2 is provided to discharge all accumulated charges in the capacitor C1 once the piezoelectric element voltage drops below the voltage level on the capacitor C1.

In certain applications, when the piezoelectric voltage drops, the amount of discharge through the diode D2 can be limited to a drop of the capacitor C1 voltage to a certain threshold. The voltage threshold may be desired, for example, for allowing the voltage at the circuitry OUTPUT not to drop below a certain limit. As an example, such a goal can be readily achieved by the addition of a Zener diode Z2 (not shown) between the diode D2 and the piezoelectric element 302. As a result, when the piezoelectric voltage drops, the charges accumulated in the capacitor C1 is discharged through the diode D2, but only to the breakdown voltage level of the diode Z2 instead of dropping to essentially the voltage level of the piezoelectric element 302.

It is noted that leaking through resistors R2 and R3 is also used to lengthen the amount of time that is needed for the piezoelectric element to charge the capacitor C1. This capability provides a simple tool to readily adjust ("program") the device to the desired hardened bunker barrier detection condition. The leakage through resistors R2 and R3 would also provide additional means of ensuring that the aforementioned high voltage and short duration pulses do not accumulate charges in the capacitor C1 to trigger a false hardened barrier detection signal.

In addition, vibration loading—usually with relatively low peak G loadings that are significantly lower than those of accidental drops or the like—for long periods of time, such as those experienced during transportation or other similar conditions, even if they are accompanied with occasional high G but short duration shock loading pulses, are similarly rejected by the diode Z1 and the leaking resistors R2 and R3. The breakdown voltage of the diode Z1 is generally selected to be below the weakest expected hardened bunker barrier detection condition indicating voltage of the capacitor C1.

The hardened bunker barrier detection electronic and logic circuit of the piezoelectric based sensor shown in FIG. 5 provides an output voltage that can be monitored by the munitions fuzing electronics and processor to detect hardened bunker barriers or the like encounter events and determine the strength of the barriers as a function of time. The measured acceleration signal can then be integrated to determine the barrier thickness.

Figure 6:
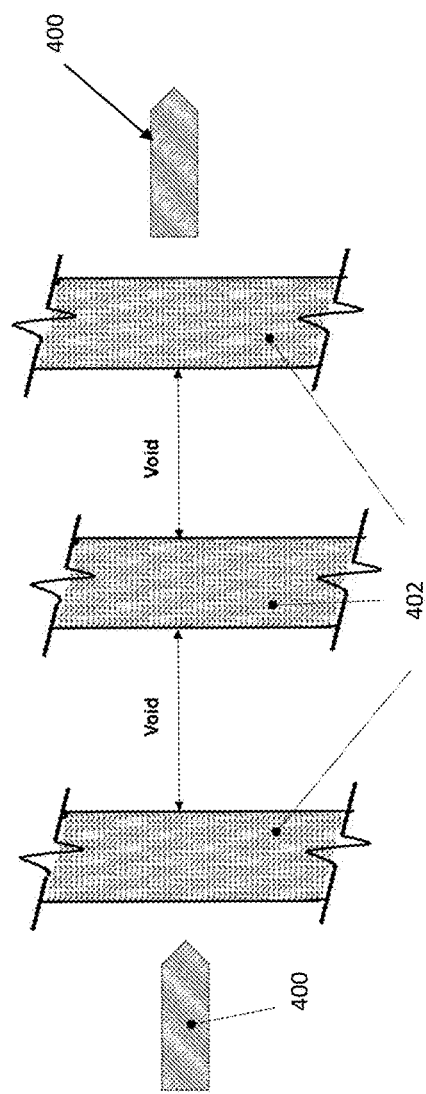
FIG. 6 illustrates a schematic of a projectile moving through several significant barriers.
Figure 7:
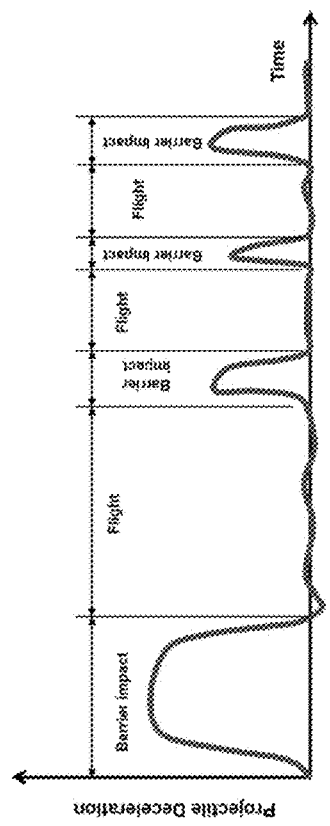
FIG. 7 illustrates a sensor output for the projectile moving through the several significant barriers of FIG. 6.

As an example, if a projectile 400 that is provided with the piezoelectric based senor 300 encounters several hardened bunker type barriers 402, such as those shown in FIG. 6, then a corresponding output of the sensor is expected to be as shown in FIG. 7. In FIG. 7, the deceleration signal strength is proportional to the strength of the barrier. The sharp signal output due to the design of the sensor circuit 300 allows for accurate measurement of the barrier thickness.

The piezoelectric based sensor 300 outputs are input to a controller for determining one or more of the number of hardened bunkers, a thickness of the one or more hardened bunkers and a strength of the one or more hardened bunkers based on the output of the piezoelectric based sensor 300 over time.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A device for detecting one or more hardened bunkers within a target, the device comprising:
a sensor, which when fired to travel through the one or more hardened bunkers, produces a first output, the first output being different from a second output when the sensor travels in a void between the one or more hardened bunkers or encounters other objects outside of the one or more hardened bunkers, wherein the sensor comprises;
a member, movement of the member producing the second output;
a locking member having a first portion for engaging a free end of the member, the locking member being movable in a first direction;
a mass movable in a second direction offset from the first direction, the mass having a first end for engagement with a second portion of the locking member such that movement of the mass in the second direction moves the locking member such that the first portion of the locking member engages and locks the free end of the member to produce the first output.

2. The device of claim 1, further comprising a proof mass disposed at a position on the member.

3. The device of claim 1, wherein the member is a cantilevered beam having the free end.

4. The device of claim 1, further comprising one or more stops for limiting an amount of movement of the mass in the second direction.

5. The device of claim 1, wherein the sensor is fabricated is a MEMS device.

6. The device of claim 1, further comprising a controller for determining one or more of the number of hardened bunkers, a thickness of the one or more hardened bunkers and a strength of the one or more hardened bunkers based on the first and second outputs of the sensor over time.

* * * * *